United States Patent [19]
Petrick

[11] Patent Number: 5,872,965
[45] Date of Patent: Feb. 16, 1999

[54] SYSTEM AND METHOD FOR PERFORMING MULTIWAY BRANCHES USING A VISUAL INSTRUCTION SET

[75] Inventor: Bruce Petrick, Sunnyvale, Calif.

[73] Assignee: Sun Microsystems, Inc., Palo Alto, Calif.

[21] Appl. No.: 884,997

[22] Filed: Jun. 30, 1997

[51] Int. Cl.$^6$ ...................................................... G06F 9/00
[52] U.S. Cl. ................... 395/583; 395/800.23; 395/583; 395/800.2; 345/501; 345/502; 345/503; 345/522
[58] Field of Search .................. 395/800.22, 800.23, 395/800.2, 800.16, 800.02, 800.01, 376, 733, 565, 566, 583; 345/501, 502, 503, 506, 522, 191, 193, 197, 517

[56] References Cited

U.S. PATENT DOCUMENTS

| | | | |
|---|---|---|---|
| 4,907,192 | 3/1990 | Kaneko | 395/583 |
| 5,210,833 | 5/1993 | Kaneko | 395/583 |
| 5,734,874 | 3/1998 | Van Hook | 395/513 |
| 5,794,026 | 8/1998 | Hervin | 395/583 |
| 5,815,697 | 9/1998 | Bosshart | 395/583 |

OTHER PUBLICATIONS

Mou, Z.J.A. et al., VIS Based native video processing on Ultasparc, International Conferences on Image Processing Sep. 1996, pp. 153–156 vol. 2.
Blanck, G. et al., The Supersparc microprocessor, IEEE Computer Society Press, Feb. 1992, pp. 136–141.

*Primary Examiner*—Larry D. Donaghue
*Assistant Examiner*—Stacy Whitmore
*Attorney, Agent, or Firm*—Leland Weisner; Sun Microsystems, Inc

[57] ABSTRACT

An innovative method and system of performing multiway branch operations on a microprocessor architecture which supports single instruction multiple data (SIMD) operations is provided. A computer processor includes a branch condition register, a graphic status register, a displacement register, a branch offset register, a program counter register and circuit logic responsive to a multiway branch opcode. Bitwise AND logic coupled to the branch condition register and the graphic status register performs a bitwise logical AND between a mask contained in the branch condition register and multiple comparison results contained in the graphic status register. An output port from bitwise logical AND is coupled to a constant array and selects a set of constant values based on the bitwise logical AND result value. A shifter logic coupled to the branch offset register and the displacement register bitwise left shifts the displacement value stored in the displacement register a predetermined amount based upon the value in the branch offset. The shifter logic is also coupled to receive a constant value from the constant array which is added to the shifted result by concantenating the constant value to the lower order bits shifted into the shifter logic. An adder circuit coupled to the shifter logic and a program counter register adds the results to the program counter value to generate a relative branch address. Finally, a branch logic coupled to the adder circuit responds to the multiway branch opcode and sets the program counter to the relative branch address provided by the adder circuit.

3 Claims, 8 Drawing Sheets

| Variable Length Codes | Run | Level |
|---|---|---|
| 10 | End of Block ||
| 1s | 0 | 1 |
| 0000 01 | Escape ||
| 011s | 1 | 1 |
| 0100s | 0 | 2 |
| ⋮ | | |
| 0000 0000 0001 1011s | 31 | 1 |

SYSTEM AND METHOD FOR PERFORMING MULTIWAY BRANCHES USING A VISUAL INSTRUCTION SET

FIELD OF THE INVENTION

The present invention relates generally to computer languages and, more specifically, to a system and method for performing multiway branches using a visual instruction set.

1. Copyright Notice

A portion of the disclosure of this patent document contains material which is subject to copyright protection. The copyright owner has no objection to the xeroxgraphic reproduction by anyone of the patent document or the patent disclosure in exactly the form it appears in the Patent and Trademark Office file or records, but otherwise reserves all copyright rights whatsoever.

2. Related Applications

This application is related to U.S. application Ser. No. 8/884,256, filed Jun. 27, 1997, entitled "A MODULAR COPROCESSOR UNIT WITH INTEGRATED MULTIMEDIA FUNCTIONS" and naming Bruce Petrick as inventor, U.S. application Ser. No. 8/884,257, filed Jun. 27, 1997, entitled "A PROCESSOR COMPLEX FOR EXECUTING MULTIMEDIA FUNCTIONS" and naming Bruce Petrick and Mukesh Patel as inventors, U.S. application Ser. No. 8/563,033, filed Nov. 27, 1995, now U.S. Pat. No. 5,767,867, entitled "METHOD FOR ALPHA BLENDING IMAGES UTILIZING A VISUAL INSTRUCTION SET", by Xiao Ping Hu, and U.S. application Ser. No. 8/638,390, filed Apr. 26, 1996, entitled "A CENTRAL PROCESSING UNIT WITH INTEGRATED GRAPHICS FUNCTIONS", by Robert Yung et. al, which are assigned to the assignee of the present invention and are incorporated herein by reference in their entirety for all purposes.

BACKGROUND OF THE INVENTION

Historically, computers were designed to perform repetitive calculations quickly and accurately. Today, advancements in the area of digital image processing, or more broadly digital signal processing, can be attributed to the increased ability of computers to perform repetitive calculations as quickly as possible.

A digital image is represented by a collection of pixels having different colors, or grayscale, intensity values. These images can be generated from any number of sources including scanners, medical equipment, or graphics programs. Alternatively, digital images can also be generated from analog images such as photographs. Typically, the collection of pixels are arranged in rows and columns. The color of a pixel at a particular x–y coordinate on a display screen or similar two-dimensional output device is represented by a groups of bits assigned a digital code associated with a color space. A Red, Green, and Blue (RGB) color space format is an additive color space in which various amounts of each of the RGB components are added together for a desired color.

Alternatively, color spaces YUV, YIQ, and YCbCr represent colors as color difference components. In the simplest gray-scale images, each pixel is represented by a luminance (or intensity value) using the Y component in each of these color spaces. Color images have additional groups of bits for the UV, IQ, and CbCr components in each of the respective color spaces which represent a chrominance component. Television, such as NTSC (National Television System Committee) or PAL (Phase Alternation Line), as well as digital image standards, such as MPEG (Moving Picture Expert Group), use the difference color space to represent pixels because they can be transmitted using less bandwidth, stored using less storage, and processed more quickly.

Modern digital image processing techniques involve manipulating these pixel values for image enhancement and image compression purposes. The goal of image enhancement usually involves processing groups of pixels and manipulating the bit values to achieve some special visual effect. Some image enhancements include image sharpening, image softening, and image blending.

In contrast, the goal of image compression is to represent an digital image, or any input signal, using a minimal amount of resources, while still being able to re-construct the original data or image. Depending on the complexity of each digital image, compression can sometimes reduce the size of data by 3 to 20 times of the original size. This is especially important for digital image processing, because of the vast amounts of data often involved. Recent advances in image processing have enabled people to download images quickly over the Internet and store the resulting data sets using relatively small storage requirements. For example, a landsat D satellite typically transmits an image size of 6100×6100 pixels, which, at 8 bits/pixel, translates to approximately 372 Megabytes of image data. Without compression, downloading such an image over the Internet or storing it on a storage device would not be feasible both economically or logistically.

Fortunately, it is not necessary to display all of the data for the reconstruction to be an adequate representation of the original. For this reason, "lossy" compression techniques are used which eliminate certain bits in the images which are unnecessary. This process of data compression can be divided into two parts. The first step removes redundant information in the image that is not be required for reconstruction. Generally, this is caused by inherently high degree of correlation between pixel values found in digital images. For example, standards such as MPEG[1] isolates both temporal redundancies and spatial redundancies in digital video to eliminate unnecessary bits. Spatial redundancy occurs when objects in the image tend to have only slight variations in intensity or color across the area of a given frame image. Temporal redundancy occurs when a sequence of images tend to contain the same objects in approximately the same position in a sequence of frames.

1. MPEG (Moving Pictures Expert Group) is a group of people that meet under ISO (International Standards Organization) to generate standards for digital video (temporal sequencing of images) and audio compression. MPEG is a nickname for the video/audio standards and the official name is ISO/IEC JTC 1 SC29 WG11 where IEC is International Electro-technical commission; JTC 1 is Joint Technical Committee 1; SC29 is Subcommittee 29; and WG11 is Work Group 11.

The second step in compression is to code the non-redundant data in such a way that the smallest possible number of bits are needed to represent the image. Variable length coding (VLC) techniques are used to code high frequency bit patterns in the image with shorter codes and low-frequency bit patterns in the image with longer codes. Typically, these coding techniques are based on variable length Huffman codes or arithmetic coding methods. Even though arithmetic coding methods can offer higher compression, licensing fees for the arithmetic coding methods result in most techniques adopting the Huffman coding methodologies. For example, MPEG encoding/decoding uses Huffman tables shown in FIG. 1 to code and decode bit patterns typically used to represent digital images. The code is variable length so that frequent bit patterns are represented using shorter codes and infrequent bit patterns are represented with longer codes. Overall, this technique tends to compress the images but makes decoding the information process intensive.

Figure 1:
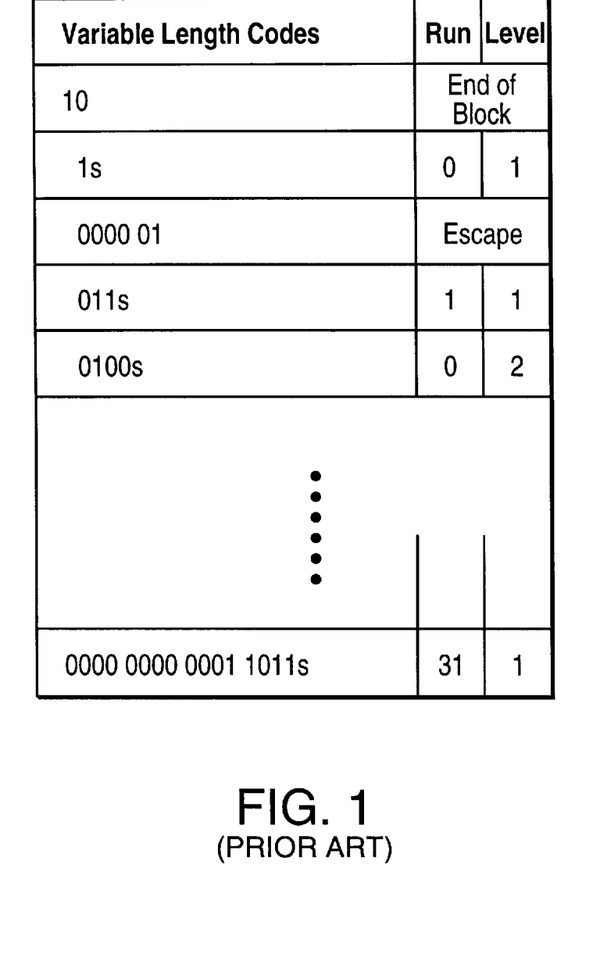
FIG. 1 is an excerpt from a table of variable length codes used in MPEG coding and decoding.

While image processing techniques, such as MPEG decoding/encoding, are performed using existing software libraries, generalized instructions are used in these libraries to drive the integer and floating point functional units. These generalized instructions and processors have difficulty performing pixel operations because they are performed sequentially. For example, to decode an MPEG video stream each group of pixels must be compared against a large number of variable length bit sequences. This requires the processor to perform many comparisons and branching operations. A sample of the variable length codes used in the Huffman decode tables for MPEG is shown in FIG. 1 for exemplary purposes only. Complete Huffman decode lookup tables typically include well over 100 different variable length entries. Large variable length lookup tables, such as Huffman decode lookup tables, represent a trade-off between compression and coding efficiency versus processing speed. At the processor level, conventional comparisons and decoding in these large lookup tables are executed on general purpose processors sequentially. This can make MPEG decoders for embedded systems and devices prohibitively expensive or, alternatively, unacceptably slow.

More sophisticated image processing techniques must be developed as the size of digital images increase. Ubiquitous computing, having one user operate many small embedded processors in devices both in business and home, also requires that image processing techniques become more efficient. These general purpose processors should execute instructions in parallel and take advantage of the parallelism inherent in image processing and data compression. Thus, there is a need to improve the techniques used to perform image processing routines used in image enhancement and compression. The present invention fulfills this need and other needs.

SUMMARY OF THE INVENTION

Embodiments of the present invention provide an innovative method and system of performing multiway branch operations on a microprocessor architecture which supports single instruction multiple data (SIMD) operations. A SIMD instruction can issue a single instruction to operate on multiple distinct data. VIS, by Sun Microsystems, Inc., and MMX, by the Intel, Corporation of Santa Clara, California, are just two examples of SIMD instructions. Essentially, SIMD operations take advantage of the microprocessors ability to perform operations in parallel. Thus, the multiway branch instruction and supporting circuitry of the present invention can be added to many different processors which provide support for SIMD instructions, a processor which executes partitioned compare and byte shuffle operations in parallel. The multiway branch instruction and circuitry enables a processor to make multiple conditional branches in a single instruction rather than multiple instructions. This is particularly useful in decoding and decompressing large amounts of data quickly. For example, one embodiment of the present invention multiway branch can be used to decode the discrete-cosine transforms used by MPEG, JPEG, and other graphics standards, to compress pixel information in still and video images.

In one embodiment, a computer processor includes a branch condition register, a graphic status register, a displacement register, a branch offset register, a PC (program counter) register and circuit logic responsive to a multiway branch opcode. Bitwise AND logic coupled to the branch condition register and the graphic status register performs a bitwise logical AND between a mask contained in the branch condition register and multiple comparison results contained in the graphic status register. The mask is a binary value which determines which of the multiple comparison results in the graphic status register are to be used for branching purposes. A branch is taken on the first bit generated by the bitwise logical AND which is true (i.e. equal to a value of "1"). An output port from bitwise logical AND is coupled to a constant array and selects a set of constant values based on the bitwise logical AND result value. A shifter logic coupled to the branch offset register and the displacement register bitwise left shifts the displacement value stored in the displacement register a predetermined amount based upon the value in the branch offset. This inserts zero bits into the low order portion of the displacement value. The shifter logic is also coupled to receive a constant value from the constant array which is added to the shifted result by concantenating the constant value to the lower order bits shifted into the shifter logic. The concatenation does not incur a carry because the constant value can be represented with less bits than added during the shift operation. An adder circuit coupled to the shifter logic and a program counter register adds the results to the program counter value to generate a relative branch address. Finally, a branch logic coupled to the adder circuit responds to the multiway branch opcode and sets the program counter to the relative branch address provided by the adder circuit.

Embodiments of the invention provide a SIMD instruction which can improve processor performance by reducing the number of comparison and branch instructions typically used in a software application. This is particularly useful in digital signal processing and image processing applications where similar operations are performed on each pixel in an image or data element in a data stream. The multiway branch instruction checks for multiple conditions in one instruction and reduces the amount of processing accordingly.

BRIEF DESCRIPTION OF THE DRAWINGS

These and other features and advantages of the present invention will be apparent from the Detailed Description and the corresponding Figures. Like or similar features are designated by the same reference numeral(s) throughout the drawings and the Detailed Description.

DETAILED DESCRIPTION

Overall Computing Environment

Figure 2:
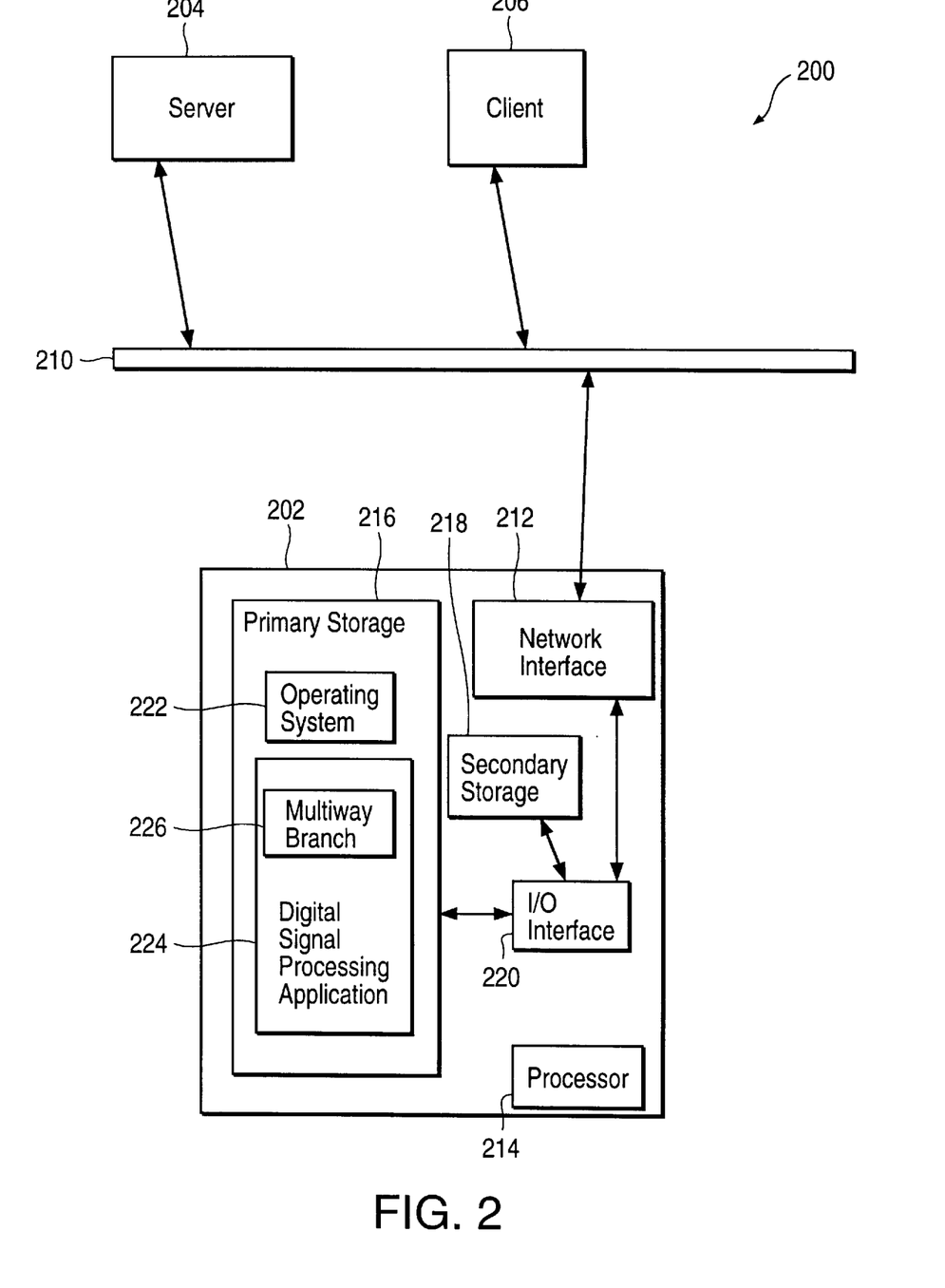
FIG. 2 illustrates a computer network including server computers and client computers executing one embodiment of the present invention and configured to communicate over a network.

FIG. 2 illustrates a computer network 200 including client computer 202 and server computer 204 configured to communicate with a client computer 206 over a network 210. The processors in these computer systems can process single instruction multiple data (SIMD) instructions. In one embodiment, these processors execute SIMD instructions designed in accordance with the Visual Instruction Set [1](VIS), and include circuitry to support execution of a multiway branch instruction designed in accordance with the present invention. Alternatively, these SIMD instructions and supporting circuitry could also be modeled to work with the MMX instruction set designed by the Intel Corporation of Santa Clara, Calif. Generally, embodiments of the present invention are designed to be used on computers for performing image processing including MPEG encoding/decoding, JPEG encoding/decoding, or any other image processing routines where a multiway branch would be advantageous in processing data.

1. VIS™ is a trademark of Sun Microsystems, Inc.

Referring to FIG. 2, Server 202 includes a network interface 212, a processor 214, a primary storage 216, a secondary storage 218, and an I/O (input output) interface 220 which facilitates communication between these aforementioned elements. Network interface 212 couples server 202 to network 210 and facilitates two-way data communication between server computer 102 and other computers on the network 210. For example, if network interface 212 is an integrated services digital network (ISDN) card or a modem, network interface 212 provides a physical connection to the corresponding type of telephone line. If network interface 212 is a local area network card (LAN) card, network interface 212 provides a physical connection to a compatible LAN. Wireless links are also possible. Preferably, the client and server computers coupled to this network transmit information utilizing the TCP/IP protocol. Other network protocols such as SNA, X.25, Novell Netware[2], Vines, or AppleTalk could also be used to provide similar client-server communication capabilities. In any such implementation, network interface 212 sends and receives electrical, electromagnetic, optical signals, or other signals which carry digital data streams representing various types of information.

2. Netware is a registered trademark of Novell, Inc. in the United States and other countries.

Network 210 typically includes one or more sub-networks (not shown) which can provide data communication to other data devices. For example, network 210 can provide a network connection between client 202 and client 206, in part, using a world wide packet data communication network now commonly referred to as the "Internet". The Internet uses electrical, electromagnetic, optical, or other signals to carry digital data streams representing various types of information. The signals carried through network 210 and through network interface 212, which carry the digital data to and from server 202, are exemplary forms of carrier waves transporting the information.

Server 202 can send messages and receive data, including program code of the present invention, through network 210, and network interface 212. In the Internet example, a server computer 204 might transmit a requested code for an application through the Internet using network 210 to client computer 202. In accord with the invention, one such downloaded application can include a method for multiway branching using a Visual Instruction Set (VIS) and is described later herein. The downloaded application code can be executed by client computer 202 as it is received, and/or stored in a storage device for later execution. In this manner, client computer 202 can obtain application code in the form of a carrier wave.

Typically, processor 214 on server 202 fetches computer instructions from primary storage 216 through I/O interface 220. After retrieving these instructions, processor 214 executes these computer instructions. Executing these computer instructions enables processor 214 to retrieve data or write data to primary storage 216, secondary storage 218, display information on one or more computer display devices (not shown), receive command signals from one or more input devices (not shown), or retrieve data or write data to other computer systems coupled to network 210 such as server 204, and client 206. Those skilled in the art also understand that primary storage 216 and secondary storage 218 can include any type of computer storage including, without limitation, randomly accessible memory (RAM), read-only-memory (ROM), magnetic storage devices and optical storage media such as CD-ROM.

Primary storage 216 includes an operating system 222 for managing computer resources. In one embodiment, this operating system is the Solaris operating system or any operating system with support for object oriented programming languages such as the JAVA programming language or high level programming languages such as C or C++. Also included in primary storage 216 is a digital signal processing application 224 which utilizes a multiway branch instruction 226 designed in accordance with the present invention. As will be apparent from the discussion below, embodiments of multiway branch instruction 226 can be used to facilitate improved processing characteristics associated with MPEG encoding/decoding, JPEG encoding/decoding, and any other digital signal processing method where conditionally branching to multiple locations can improve overall performance. Specifically, this is useful in MPEG decoding when it becomes necessary to branch to any one of many decoding routines depending on a variable length bit pattern contained in a compressed digital image. A multiway branch instruction compares the variable length bit pattern with many corresponding Huffman codes, a portion which are illustrated in FIG. 1, using a Visual Instruction Set (VIS) and branches to the appropriate routines depending on the results. This takes advantage of SIMD (single instruction multiple data) type instructions to process groups of pixels in parallel rather than the sequential manner as was performed in the prior art.

In one embodiment, processor 214 can be any of the SPARC compatible processors, UltraSPARC compatible processors or JAVA[1] compatible processors available from Sun Microsystems, Inc. of Mountain View, Calif. which implement the Visual Instruction Set (VIS) Version 2.0 or greater, also designed by Sun Microsystems, Inc. Alternatively, processor 214 can be based on the PowerPC processor available from Motorola of Schaumburg, Ill., or any of the Pentium or x86 compatible processors available from the Intel Corporation or other corporations such as AMD, and Cyrix which perform equivalent SIMD (single instruction multiple data) type operations provided in the Visual Instruction Set. Accordingly, alternative SIMD type instruction sets include Intel Corporations Multi Media Extension or MMX instruction set as implemented in the Pentium or Pentium II processor lines.

1. JAVA, PicoJAVA, UltraJAVA, HotJAVA, The Network Is the Computer, Sun, the Sun logo, Sun Microsystems, Solaris, and Ultra are trademarks or registered trademarks of Sun Microsystems, Inc. in the United States and in other countries. All SPARC trademarks are used under license and are trademarks or registered trademarks of SPARC International, Inc. in the United States and other countries. Products bearing SPARC trademarks are based upon an architecture developed by Sun Microsystems, Inc. UNIX is a registered trademark in the United States and other countries exclusively licensed through X/Open Company, Ltd.

I/O Interface 220 represents the system bus architecture of client computer 202. However, I/O interface 220 is illustrative of any interconnection scheme to link the subsystems. For example, a local bus could be utilized to connect processor 214 to primary storage 226 and network interface 212. Client computer 202 is but one example of a computer suitable for use with the present invention. Other configurations of subsystems suitable for use with the present invention will be readily apparent to one of ordinary skill in the art.

Figure 3:
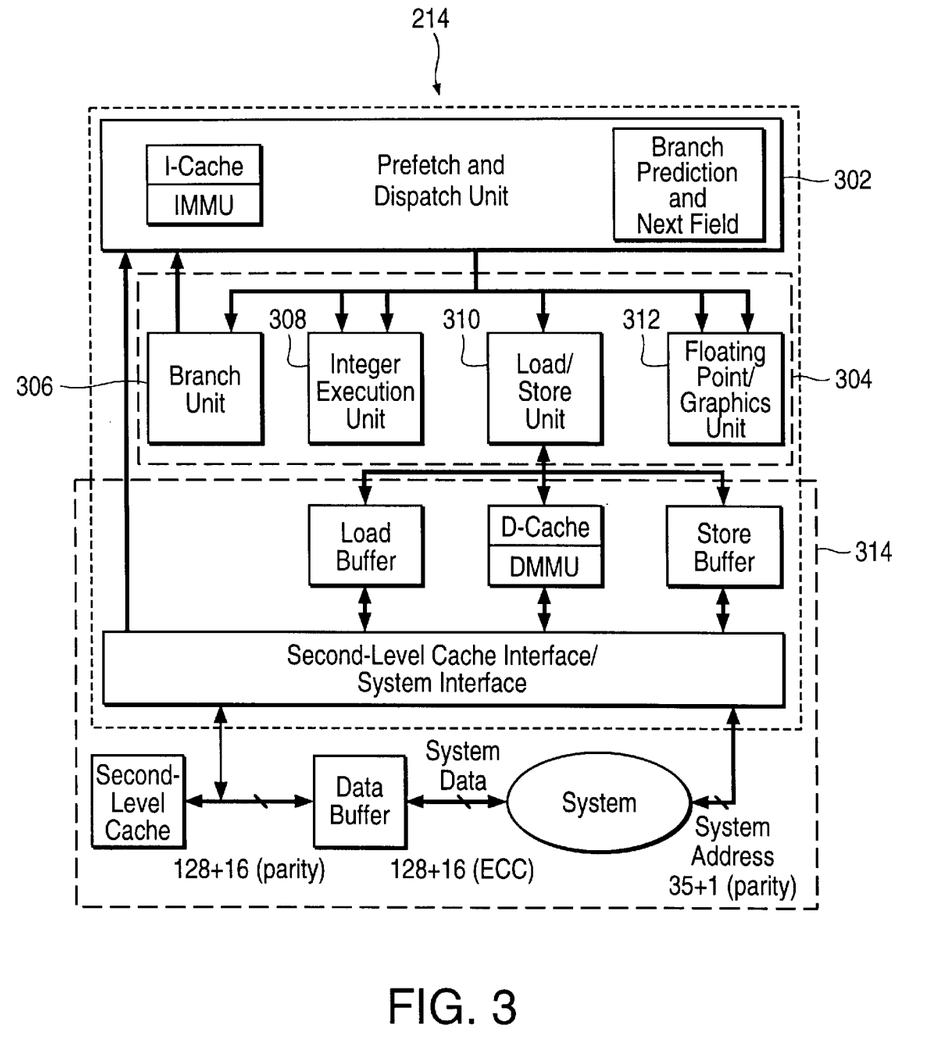
FIG. 3 is a block diagram illustrating the major functional units in the UltraSPARC-I processor.

Referring now to FIG. 3, a block diagram illustrates the major functional units in the UltraSPARC-I processor. The UltraSPARC-I processor can be used for processor 214 illustrated and discussed above with respect to FIG. 2. UltraSPARC-I implements the SIMD Visual Instruction Set (VIS) designed by Sun Microsystems, Inc. . Accordingly, processor 214 in FIG. 3 includes a front end Prefetch and Dispatch Unit (PDU) 302. PDU 302 prefetches instructions based upon a dynamic branch prediction mechanism and a next field address which allows for a single cycle branch to follow. Typically, branch prediction is better than 90% accurate which allows PDU 302 to supply four instructions per cycle to a core execution block 304.

Core execution block 304 includes a branch unit 306, an integer execution unit (IEU) 308, a load/store unit (LSU) 310, and a floating point/graphics unit (FGU) 312. The units making up core execution block 304 can operate in parallel executing up to four instructions per cycle which substantially enhances throughput of processor 214. IEU 308 performs the integer arithmetic or logical operations. LSU 310 executes the instructions that transfer data between a memory hierarchy 314 and register files (not shown) in IEU 308 and FGU 312. FGU performs floating point and graphics operations. For more information on the UltraSPARC-I processor see U.S. application Ser. No. 8/638,390, filed Apr. 26, 1996, entitled, "A CENTRAL PROCESSING UNIT WITH INTEGRATED GRAPHICS FUNCTIONS" by Robert Yung et. al incorporated by reference above.

Figure 4:
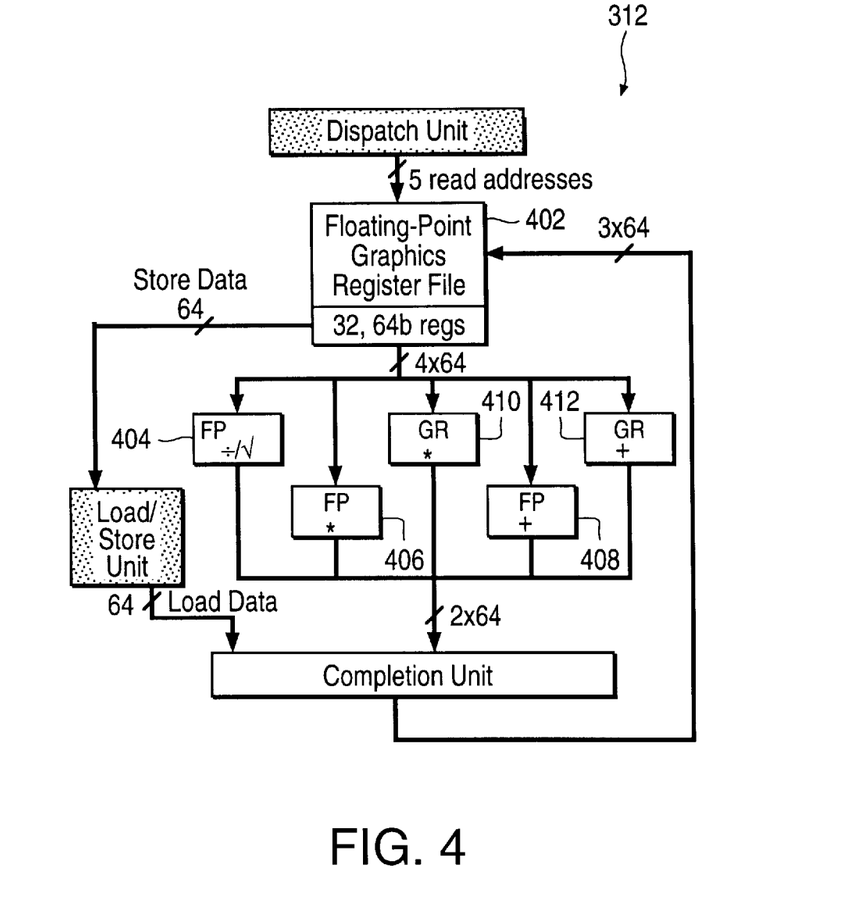
FIG. 4 is more detailed block diagram illustrating the functional units contained within floating point/graphics unit (FGU) of the UltraSPARC-I processor.

FIG. 4 is more detailed block diagram illustrating the functional units contained within floating point/graphics unit (FGU) 312. FGU 312 includes a FGU register file 402 and five functional units which can operate in parallel. In one embodiment, FGU register file 402 incorporates 32 64-bit registers. Three of the functional units are a floating point divider 404, a floating point multiplier 406, and a floating point adder 408. The floating point units perform all the floating point operations. The remaining two functional units are a graphics multiplier (GRM) 410 and a graphics adder (GRA) 412. The graphical units perform all the graphics operations of the Visual Instruction Set (VIS) instructions.

The Visual Instruction Set (VIS) instructions are machine code extensions that allow for enhanced graphics capabilities. The VIS instructions typically operate on partioned data formats. In a partioned data format, 32-bit and 64-bit words include multiple word components. For example, a 32-bit word can be composed of four unsigned bytes and each byte can represent a pixel intensity value of an image. As another example, a 64-bit word can be composed of four signed 16-bit words and each 16-bit word may be used to perform a four pixel compare operations simultaneously.

The VIS instructions allow processor 214 (FIG. 2) to operate on multiple pixels or bands in parallel. GRA 412 performs single cycle partitioned add and subtract, data alignment, merge, expand, and logical operations. GRM 410 performs three cycle partitioned multiplication, compare, pack, and pixel distance operations.

Multiway Branch Instruction

Figure 5:
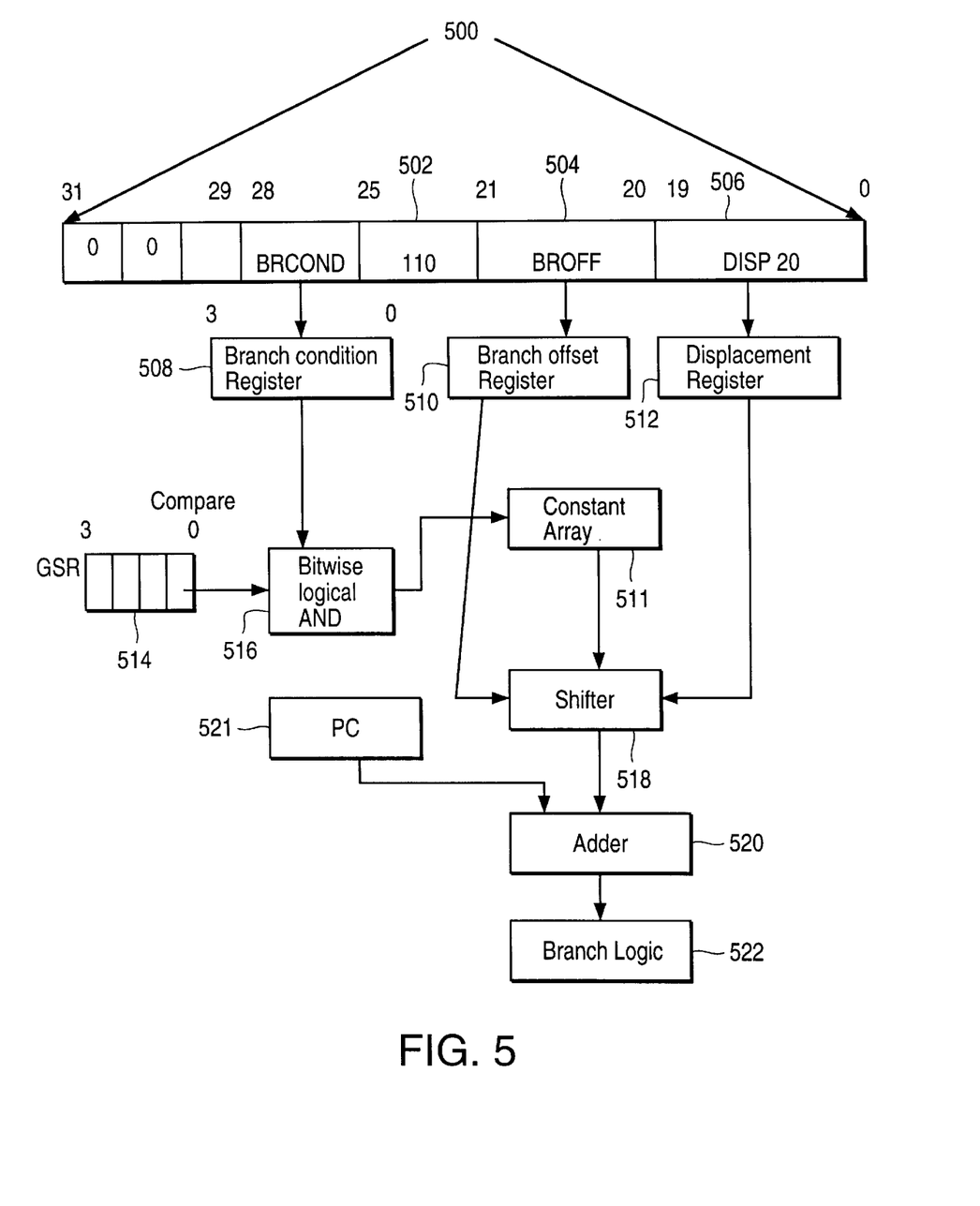
FIG. 5 is a flow diagram of a multiway branch instruction designed in accordance with principles of the present invention.

FIG. 5 is a flow diagram of a multiway branch instruction 500 designed in accordance with principles of the present invention. Multiway branch instruction 500 can be executed on a computer processor having a branch condition register, a graphic status register, a displacement register, a branch offset register, and circuit logic responsive to a multiway branch opcode of the present invention. In one embodiment, the multiway branch instruction 500 (brvcc (brcond, disp20)) includes a 4-bit branch condition (brcond) portion 502, a 2-bit branch offset (broff) portion 504, and a 20-bit displacement (disp20) portion 506. Multiway branch instruction and circuitry discussed below can be added to a processor utilizing the Visual Instruction Set (VIS).

Branch condition portion 502 of multiway branch instruction 500 is stored in a branch condition register 508. A mask field contained in branch condition register 508 contains a bit pattern generated by the user. The mask is a binary value used for selecting which of the condition results in a register should cause a branch. For example, a 4-bit branch condition portion 502 allows for four different branch decisions to be made in one instruction by selecting the binary mask "1111". Similarly, the first three condition results in a register can be used for making a branch by selecting the values "1110".

Branch offset portion 504 of multiway branch instruction 500 is stored in a branch offset register 510. A branch offset value continued in branch offset register 510 controls the calculation of a base offset for a series of branches. Multiway branch instruction 500 uses a branch offset to determine how many bits to shift a displacement value discussed below. For example, a 2-bit branch offset portion 504 can select from four different base offsets using a displacement portion value.

Displacement portion 506 of multiway branch instruction 500 is stored in a displacement register 512. A displacement value contained in displacement register 512 is used in calculating the offset for the branch instruction. In one embodiment, a displacement value is 20 bits and corresponds the memory location where the branch occurs.

A PC (program counter) value is stored in a PC register 521 for making the branch operation relative to the PC when the multiway branch instruction is executed.

High-level logic circuitry illustrated in FIG. 5 is provided to illustrate one embodiment of the present invention. However, details on each individual element are not provided because one skilled in the art will understand how they are constructed, connected, and implemented in a processor which processes SIMD instructions such as the Visual Instruction Set or the MMX instruction set.

A shifter logic coupled to the branch offset register and the displacement register bitwise left shifts the displacement value stored in the displacement register a predetermined amount based upon the value in the branch offset. Finally, a branch logic coupled to the adder circuit responds to the multiway branch opcode and sets the program counter to the resulting value provided by the adder circuit.

Executing multiway branch instruction 500 involves two steps. First, a determination is made whether or not any branch conditions are met and a branch should be made. Bitwise AND logic 516 coupled to branch condition register 508 and graphic status register 514 performs a bitwise logical AND between the mask value contained in branch condition register 508 and the multiple condition results contained in graphic status register 514. The mask value depends on the data set being used and the operation used to set the bits in graphic status register 514. In one embodiment using the VIS instruction set, multiple comparison results are set in 4-bits of graphics status register 514 as a result of a partitioned 4-way 16-bit pixel compare using the VIS instruction fcmp16cc. The partitioned compare allows four different pixel values to be compared in a single instruction implementing VIS and will be discussed in further detail below. Accordingly, the mask is set to a value of "1111" to test all four condition results generated in graphics status register 513. A branch is taken if any one of the bits from the bitwise logical AND are true (i.e. equal to a value of "1"). Otherwise, no branch is taken. An output port from the bitwise logical AND is coupled to a constant array and selects a set of constant values based on the bitwise logical AND result value. The constant value is used later in a shifter logic 518 discussed below.

Second, if a branch condition occurs, the multiway branch instruction must calculate a branch address. A shifter logic 518 coupled to branch offset register 510, displacement register 512, and a constant array 511 bitwise shifts the displacement value stored in the displacement register a predetermined amount based upon the branch offset value in branch offset register 510. This inserts zero bits into the low order portion of the displacement value. In one embodiment, the displacement value is a 20-bit value and is shifted in accordance with the 2-bit branch offset value as indicated in the following table:

| Branch Offset (br_off) | Shift Displacement Field |
|---|---|
| 00 | disp20<<5 |
| 01 | disp20<<6 |
| 10 | disp20<<7 |
| 11 | disp20<<8 |

Those skilled in the art will understand the notation "<<" indicates a binary shift of the value "disp20".

Shifter logic 518 is also coupled to receive a constant value from constant array 511 which is added to the shifted result by concantenating the constant value to the lower order bits shifted into the shifter logic. The concatenation does not incur a carry because the constant value is represented using less bits than added to the displacement value during the shift operation. Shifter logic 518 selects the constant value from constant array 511 based upon the input from branch offset register 510 and, indirectly, from the results provided by bitwise logical AND 516. In one embodiment using a 20-bit displacement value and a 2-bit branch offset value, the constant values are determined in accordance with the following relationships:

| | Branch Offset (br_off) | Constant value |
|---|---|---|
| GSR[0] equal brcond[0] | 00 | 0 |
| | 01 | 0 |
| | 10 | 0 |
| | 11 | 0 |
| GSR[1] equal brcond[1] | 00 | 0x8 |
| | 01 | 0x10 |
| | 10 | 0x20 |
| | 11 | 0x40 |
| GSR[0] equal brcond[0] | 00 | 0x10 |
| | 01 | 0x20 |
| | 10 | 0x40 |
| | 11 | 0x80 |
| GSR[0] equal brcond[0] | 00 | 0x18 |
| | 01 | 0x30 |
| | 10 | 0x60 |
| | 11 | 0xc0 |

An adder circuit 520 coupled to shifter logic 518 and program counter register 521 adds the results to the program counter value to generate a relative branch address. Finally, a branch logic 522 coupled to the adder circuit responds to the multiway branch opcode and sets the program counter to the relative branch address provided by adder circuit 520 and begins executing a procedure in another section of the application.

In one embodiment, the return address from the procedure executed with a multiway branch is calculated using the instruction decoder. This requires the instruction decoder to extract a return address from an instruction and perform a branch to another routine by setting the PC to this return address value. This can take several cycles and cause extra processing delay. An alternative, and more advantageous embodiment of the present invention, stores the return address value and a process status register (PSR) or process status word (PSW) in a stack located in local memory before actually performing the multiway branch instruction. This essentially converts the multiway branch instruction into a multiway call instruction because the return address value is not extracted from a separate instruction. Instead, the return address is determined by the multiway branch instruction. Thus, the procedure can obtain the return address by popping the PC, PSR, or PSW off the local memory stack. For a computer architecture which supports an embodiment of the present invention using a local memory to store the PC, PSR, or PSW see "A MODULAR COPROCESSOR UNIT WITH INTEGRATED MULTIMEDIA FUNCTIONS" naming Bruce Petrick as inventor and "A PROCESSOR COMPLEX FOR EXECUTING MULTIMEDIA FUNCTIONS" naming Bruce Petrick and Mukesh Patel as inventors incorporated by reference above.

Although specific examples and bit lengths have been discussed above, those skilled in the art will understand that the relationships outlined above can be applied to any other processors responsive to multiway branch instructions using different corresponding bit lengths, branch condition values, branch offset values, and displacement values.

MPEG Decoding and VIS Instructions

The following discussion provides one example of utilizing the present invention to assist in decoding MPEG data streams using VIS instructions. This particular example uses two additional instructions from the VIS instruction set which are briefly discussed below. Although not explicitly discussed, one skilled in the will understand how a multiway branch could also be implemented using the MMX instruction set and used to perform MPEG decoding as discussed below.

Figure 6:
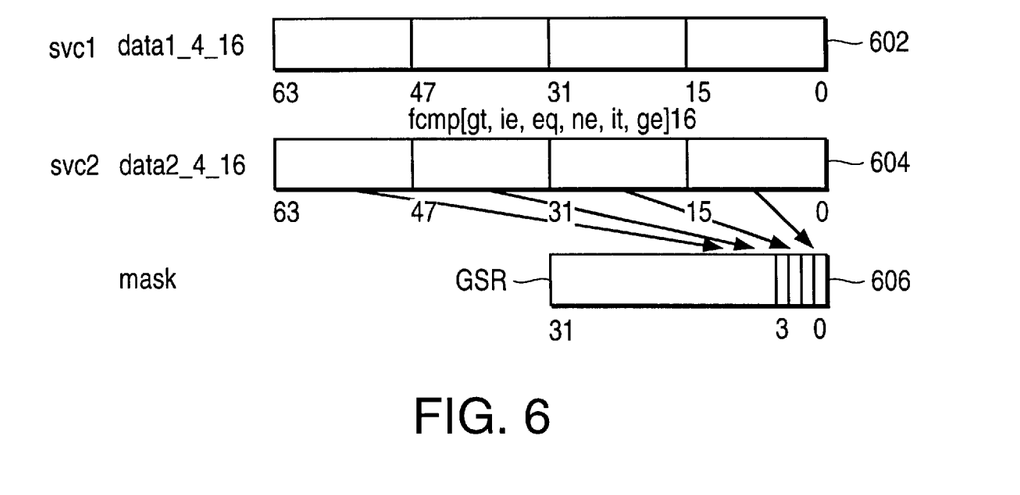
FIG. 6 is a flow diagram of a partitioned compare operation in VIS.

FIG. 6 is a flow diagram of a partitioned compare operation. For example, in VIS, vis_fcmpgt16(vis_d64 data1_4_16, vis_d64 data2_4_16) does a partitioned compare of four 16 bit partitioned fixed point values (i.e., a pixel value) in a first register 602 with a corresponding four 16 bit data values (i.e. integer values) in a second register 604. Thus, four different pixel values can be loaded into first register 602 and four integer values can be loaded into second register 604 to compare against the four pixel values in first register 602. Partitioned compares are useful because multiple pixel values can be stored in a single register and compared in a single instruction. This is an improvement over the prior art where a wide 64-bit register could only be loaded with a single 8 or 16 bit pixel value requiring multiple sequential comparison instructions to be executed.

The results of the comparison are stored in the least significant four bits of an integer mask 606 corresponding to the portion of the partition compared. Integer mask 606 can be set to the least significant bits in the integer portion of graphic status register (GSR) or, alternatively, in a general purpose register. A bit is set in third register 606 if a fixed-point value in first register 602 is greater than the corresponding fixed-point value in second register 604. Other comparisons, not shown here, such as less-than (lt), equal-to(eq), or less (le) can also be used to set the bit values.

Figure 7:
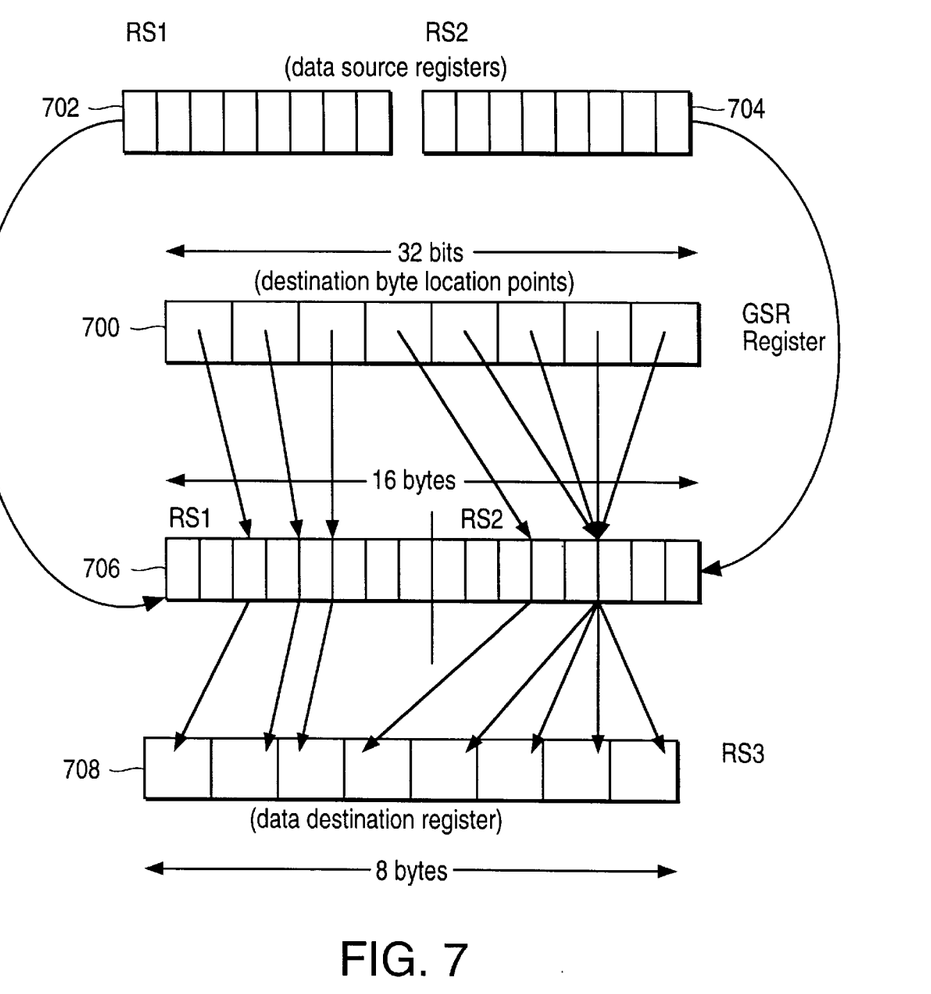
FIG. 7 is a flow diagram of a byte shuffle instruction used to selectively replicate values in one or more byte locations of a destination register in a single SIMD instruction.

FIG. 7 is a flow diagram of a byte shuffle instruction used to selectively replicate values in one or more byte locations of a destination register in a single SIMD instruction. For example, the byte shuffle instruction bshuffle(freg-rs1, freg-rs2, freg-rd) concatenates a first 64-bit floating point register 702 (freg-rs1) and a second 64-bit floating point register 704 (freg-rs2) to form a 16 byte (128 bit) value 706. A 32 bit mask is stored in a graphic status register (GSR) 700 which permutes selected elements from 16 byte value 706 into a destination register 708 as indicated in FIG. 7. Essentially, 32 bits of GSR 700 are broken down into eight 4-bit portions which are used to select one of the 16 bytes from 16 byte (128 bit) value 706 and store each value into destination register 708.

MPEG Decoding Application Using VIS Multiway Branch

Figure 8:
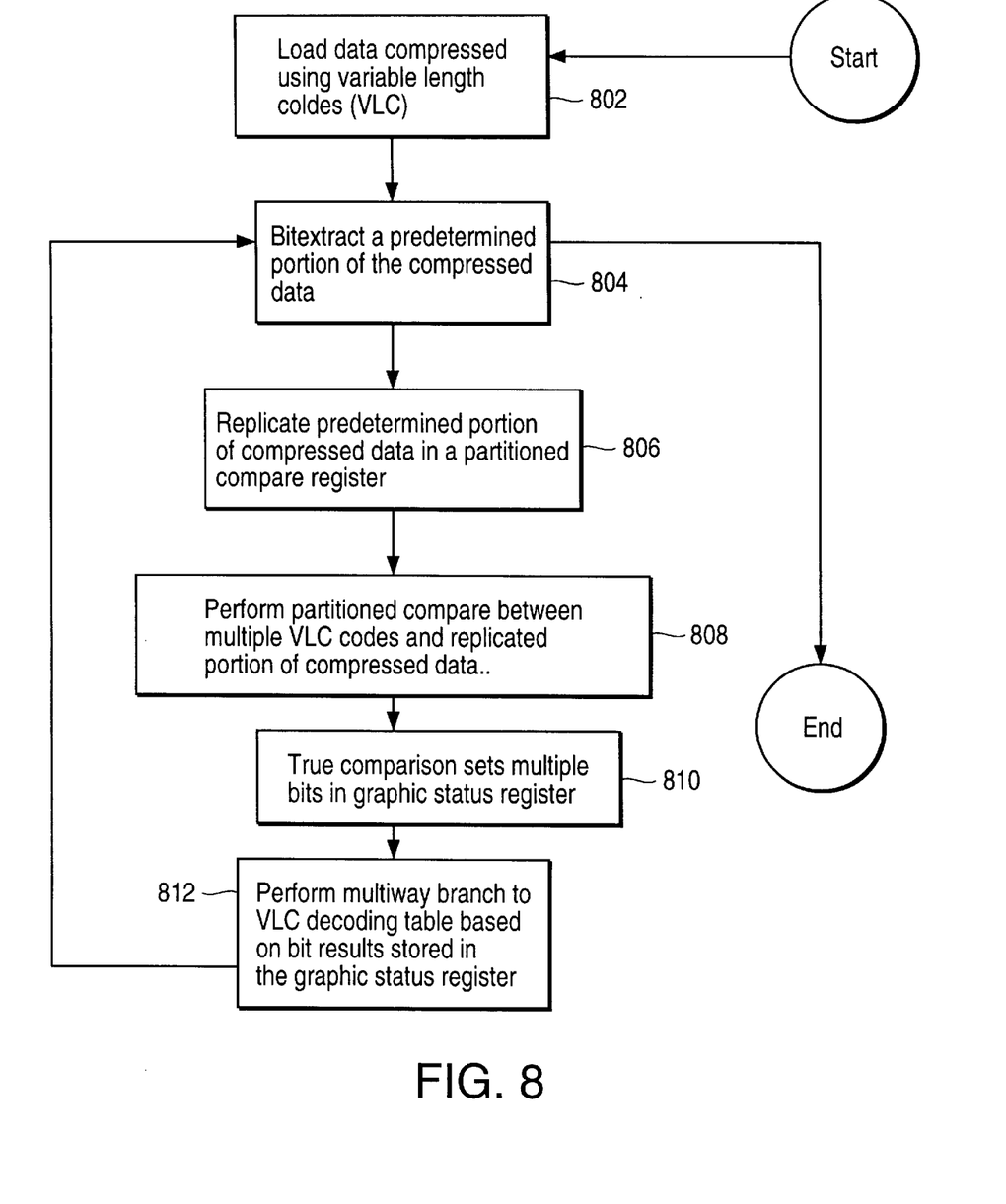
FIG. 8 is a flow chart indicating the overall steps used to decode an MPEG data stream using a multiway branch instruction designed in accordance with the present invention in combination with other SIMD instructions from the VIS instruction set.

FIG. 8 is a flow chart indicating the overall steps used to decode an MPEG data stream using a multiway branch instruction designed in accordance with the present invention in combination with other SIMD instructions from the VIS instruction set. Although the discussion below utilizes the VIS instructions, those skilled in the art will understand these overall steps are not limited to just the VIS SIMD instruction set and can readily be applied to other SIMD instruction sets which have substantially similar functionality.

At step 802, a computer loads, either from the Internet or from a storage device where it was previously stored, a compressed stream of data coded using variable length coding techniques. Specifically, this data stream could be an MPEG video compressed using variable length Huffman codes such as the variable length codes illustrated in FIG. 1.

Next, processing transfers from step 802 to step 804 where a bit-extract operation is used to extract a portion of the data stream within a given register. For example, a bit-extract operation in VIS can be used to extract 8-bits of data beginning at a particular offset in a given 64-bit register. The bit-extract instruction provides a convenient way to operate on a smaller range of bits without loading a register for each operation.

At step 806, the portion of the data stream extracted in step 804 is replicated in a partitioned compare register using the byte shuffle instruction described above. For example, the byte shuffle instruction, discussed above, can be used to fill each of the four 16-bit partitions in a 64-bit partitioned register wherein the upper 8 bits of each 16-bit partition contain a copy of the 8 bits extracted in step 804 and the lower 8 bits are zeroed out with a constant 8-bit binary value of "b 0000 0000". Those skilled in the art will understand that the lower values are zeroed out to aid in processing the variable length codes.

Next, processing transfers from step 806 to step 808 where the partitioned compare instruction vis_fcmpgt16 (vis_d64 data1_4_16, vis_d64 data2_4_16) discussed above is performed between replicated portions of the compressed data and several different variable length Huffman codes. Several of these Huffman codes are illustrated in FIG. 1. At step 810, the comparison sets several bits in a general purpose register or in the graphics status register as discussed above. It is important to note that the multiple comparisons are performed in parallel and will be used to perform the multiway branch instruction of the present invention. Those skilled in the art will understand the strategies and techniques used to determine which Huffman codes are compared first and which are compared later in the process. The order in which the variable length codes are selected is not a significant aspect of the present invention.

At step 813, the multiway branch of the present invention is used to branch to a variable length coding table based upon the comparison results in step 810. This variable length coding table contains routines for processing one or more of the variable length codes. The multiway branch utilizes the comparison results generated in step 810 in conjunction with portions of the multiway branch instruction to determine a branch location as discussed in further detail above.

At determination step 814, the method determines if there are additional variable length codes in the stream of data which need processing. Additional variable length codes by transferring processing from step 814 back to step 804. If no more variable length codes exist in the data, the data has been completely decoded.

While specific embodiments have been described herein for purposes of illustration, various modifications may be made without departing from the spirit and scope of the invention. Those skilled in the art understand that the present invention can be implemented using a variety of different hardware processors and multimedia processors coupled together in accordance with teachings of the present invention.

Accordingly, the invention is not limited to the above described embodiments, but instead is defined by the appended claims in light of their full scope of equivalents.

What is claimed is:

1. A processor for performing graphics and non-graphics operations comprising:

a branch condition register;

a program counter (PC) register;

a graphic status register;

a displacement register;

a branch offset register;

comparison logic having a first input operatively coupled to the branching condition register and a second input operatively coupled to graphic status register which responds to a multiway branch opcode and performs a bitwise logical AND logic between values provided over the first input and the second input in response to a multiway branch opcode;

a constant array including a plurality of constant values having a first input coupled to the comparison logic which responds to a multiway branch opcode and selects one of the plurality of constant values based upon the comparison logic;

shifter logic having a first input operatively coupled to the branch offset register, a second input operatively coupled to a displacement register, and a third input coupled to the constant array which responds to the multiway branch opcode, shifts the displacement register based upon the value contained in the branch offset register and concatenates a constant value provided over the shifter logic third input;

an adder having a first input operatively coupled to the shifter logic and a second input the PC register which responds to the multiway branch opcode and adds the values provided over the adder first input and the second input together; and a branch logic operatively coupled to the adder which responds to the multiway branch opcode and sets the program counter to the resulting value provided by the adder.

2. The processor of claim 1 wherein the processor performing graphics and non-graphics operations utilizes the Visual Instruction Set.

3. The processor of claim 1 wherein the processor performing graphics and non-graphics operations utilizes MMX instructions.

* * * * *